United States Patent
Yang et al.

(10) Patent No.: US 12,033,552 B2
(45) Date of Patent: Jul. 9, 2024

(54) STRETCHABLE DISPLAY MODULE AND CONTROL METHOD AND DETECTION METHOD THEREOF

(71) Applicant: Wuhan China Star Optoelectronics Semiconductor Display Technology Co., Ltd., Hubei (CN)

(72) Inventors: Jun Yang, Hubei (CN); Liang Sun, Hubei (CN); Bin Zou, Hubei (CN); Xiang Peng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/620,774

(22) PCT Filed: Nov. 25, 2021

(86) PCT No.: PCT/CN2021/133260
§ 371 (c)(1),
(2) Date: Dec. 20, 2021

(87) PCT Pub. No.: WO2023/082348
PCT Pub. Date: May 19, 2023

(65) Prior Publication Data
US 2024/0029605 A1    Jan. 25, 2024

(30) Foreign Application Priority Data
Nov. 11, 2021   (CN) .......................... 202111330588.3

(51) Int. Cl.
*G09G 3/00*    (2006.01)
*G06F 1/16*    (2006.01)

(52) U.S. Cl.
CPC ........... *G09G 3/035* (2020.08); *G06F 1/1652* (2013.01); *G06F 1/1677* (2013.01); *G09G 2380/02* (2013.01)

(58) Field of Classification Search
CPC ..... G06G 3/035; G06F 1/1652; G06F 1/1677; G09G 2380/02; G09G 3/035; G09G 3/32
See application file for complete search history.

(56) References Cited

U.S. PATENT DOCUMENTS

2016/0217551 A1*  7/2016  Kim .......................... G06T 3/08
2019/0394869 A1*  12/2019 Kim ..................... H05K 1/0281

FOREIGN PATENT DOCUMENTS

CN    106960633    7/2017
CN    111462637    7/2020
(Continued)

OTHER PUBLICATIONS

International Search Report and the Written Opinion Dated Jul. 27, 2022 From the International Searching Authority Re. Application No. PCT/CN2021/133260 and Its Translation Into English. (16 Pages).

*Primary Examiner* — Ricardo Osorio (57) ABSTRACT

A stretchable display module and a control method and a detection method thereof are provided. The stretchable display module includes a display panel, a magnetic field generator and a feedback regulation unit. The display panel includes a stretchable closed loop circuit. The magnetic field generator generates a normal phase magnetic field. The feedback regulation unit acquires an induced electromotive force, generated by the stretchable closed loop circuit in the magnetic field, in real time in a stretching process of the stretchable display module, and regulates a stretch state of the stretchable display module according to a magnitude of the induced electromotive force.

20 Claims, 5 Drawing Sheets

(56) References Cited

FOREIGN PATENT DOCUMENTS

| | | | | | |
|---|---|---|---|---|---|
| CN | 111554187 | A | * | 8/2020 | |
| CN | 112785925 | | | 5/2021 | |
| CN | 112863342 | | | 5/2021 | |
| CN | 113345327 | | | 9/2021 | |
| CN | 113450653 | | | 9/2021 | |
| CN | 110634395 | B | * | 12/2023 | ............ G06F 3/044 |
| KR | 20230019871 | A | * | 2/2023 | |

* cited by examiner

STRETCHABLE DISPLAY MODULE AND CONTROL METHOD AND DETECTION METHOD THEREOF

RELATED APPLICATIONS

This application is a National Phase of PCT Patent Application No. PCT/CN2021/133260 having International filing date of Nov. 25, 2021, which claims the benefit of priority of China Patent Application No. 202111330588.3 filed on Nov. 11, 2021. The contents of the above applications are all incorporated by reference as if fully set forth herein in their entirety.

FIELD AND BACKGROUND OF THE INVENTION

This disclosure relates to a technical field of a display, and more particularly to a stretchable display module and a control method and a detection method thereof.

Compared with a flexible display screen that is bendable or foldable, the application of a stretchable screen will have more degrees of freedom and a larger development space. For example, the stretchable screen may be used in smart apparatuses, airplanes, vehicle displays, and wearable electronic products in various fields.

The existing stretchable screen mainly collocates with the micro light-emitting diode (LED) display technology. A lot of tiny LED devices are connected together through bent wires. In a stretching process, the bent wires are straightened to stretch the screen. The micro LED can implement multi-directional stretching because of its property, but the existing terminal product is limited to the fragile property of the panel itself and shapes and length designs of the wires, and usually needs to restrict the stretching stroke and specify the unique stretching direction.

However, in the stretching process of the stretchable screen constituted by tens of thousands of micro LEDs, the damage and failure of the panel may be caused if over-stretching and too-fast stretching occur, and a lot of time and machine costs need to be spent to position a failed point if the failed panel needs to be repaired. Therefore, it is very important to establish a real-time stretch feedback regulation system in the stretchable screen.

SUMMARY OF THE INVENTION

This disclosure provides a stretchable display module and a control method and a detection method thereof capable of real-time monitoring and regulating a stretch state of the stretchable display module, and also rapidly positioning a failed position of the stretchable display module.

In a first aspect, this disclosure provides a stretchable display module including a display panel, a magnetic field generator disposed on at least one side of the display panel, and a feedback regulation unit electrically connected to the display panel, wherein: the display panel has a stretchable region and includes at least one stretchable closed loop circuit surrounding at least a portion of the stretchable region; the magnetic field generator at least covers the stretchable region and is used for generating a magnetic field at least covering the stretchable region and being perpendicular to a display surface of the display panel; and the feedback regulation unit is electrically connected to the at least one stretchable closed loop circuit, is used for acquiring an induced electromotive force, generated by the at least one stretchable closed loop circuit under an action of the magnetic field, in real time in a stretching process of the stretchable display module, and regulates a stretch state of the stretchable display module according to a magnitude of the induced electromotive force.

In the stretchable display module provided by this disclosure, the display panel further includes a peripheral region surrounding the stretchable region. The at least one stretchable closed loop circuit includes: a plurality of pixel islands, which are disposed in the stretchable region and sequentially separately disposed in a predetermined direction; stretchable wires connecting arbitrary adjacent two of the plurality of pixel islands; and peripheral stretchable traces, which are disposed in the peripheral region and serially connected to the plurality of pixel islands and the stretchable wires in a closed-loop manner. The feedback regulation unit is electrically connected to the stretchable wires or the peripheral stretchable traces.

In the stretchable display module provided by this disclosure, the stretchable display module further includes an energy storage unit, which is electrically connected to the at least one stretchable closed loop circuit, and is used for storing the induced electromotive force generated by the at least one stretchable closed loop circuit.

In the stretchable display module provided by this disclosure, the magnetic field generator includes a carrier at least covering the stretchable region, and an electroconductive coil or electroconductive ink surrounding an edge of the carrier.

In the stretchable display module provided by this disclosure, the carrier includes a main carrier body and a peripheral structure surrounding an edge of the main carrier body; the electroconductive coil or the electroconductive ink surrounds the peripheral structure; and a material of the main carrier body is a stretchable material, and a material of the peripheral structure is an unstretchable material.

In the stretchable display module provided by this disclosure, the material of the main carrier body includes polydimethylsiloxane, and the material of the peripheral structure includes glass.

In a second aspect, this disclosure further provides a control method of a stretchable display module. The stretchable display module includes a display panel, a magnetic field generator disposed on at least one side of the display panel, and a feedback regulation unit electrically connected to the display panel. The display panel has a stretchable region and includes at least one stretchable closed loop circuit surrounding at least a portion of the stretchable region. The magnetic field generator at least covers the stretchable region. The feedback regulation unit is electrically connected to the at least one stretchable closed loop circuit. The control method includes following steps of: generating, by the magnetic field generator, a magnetic field at least covering the stretchable region and being perpendicular to the display surface of the display panel; lighting up and stretching the stretchable display module; and acquiring, by the feedback regulation unit in real time, the induced electromotive force generated by the at least one stretchable closed loop circuit under the action of the magnetic field, and regulating the stretch state of the stretchable display module according to the magnitude of the induced electromotive force.

In the control method of the stretchable display module provided by this disclosure, the step of regulating the stretch state of the stretchable display module according to the magnitude of the induced electromotive force includes: determining the stretchable display module as being stretched normally when the induced electromotive force falls within a predetermined voltage range; and determining the stretchable display module as being stretched abnormally when the induced electromotive force deviates from the predetermined voltage range, and regulating a stretching speed of the stretchable display module according to the magnitude of the induced electromotive force deviating from the predetermined voltage range.

In the control method of the stretchable display module provided by this disclosure, the display panel further includes a peripheral region surrounding the stretchable region. The at least one stretchable closed loop circuit includes: a plurality of pixel islands, which are disposed in the stretchable region and sequentially separately disposed in a predetermined direction; stretchable wires connecting arbitrary adjacent two of the plurality of pixel islands; and peripheral stretchable traces, which are disposed in the peripheral region and serially connected to the plurality of pixel islands and the stretchable wires in a closed-loop manner. The feedback regulation unit is electrically connected to the stretchable wires or the peripheral stretchable traces.

In the control method of the stretchable display module provided by this disclosure, the stretchable display module further includes an energy storage unit, which is electrically connected to the at least one stretchable closed loop circuit, and is for storing the induced electromotive force generated by the at least one stretchable closed loop circuit.

In the control method of the stretchable display module provided by this disclosure, the magnetic field generator includes a carrier at least covering the stretchable region, and an electroconductive coil or electroconductive ink surrounding an edge of the carrier.

In the control method of the stretchable display module provided by this disclosure, the carrier includes a main carrier body and a peripheral structure surrounding an edge of the main carrier body; the electroconductive coil or the electroconductive ink surrounds the peripheral structure; and a material of the main carrier body is a stretchable material, and a material of the peripheral structure is an unstretchable material.

In the control method of the stretchable display module provided by this disclosure, the material of the main carrier body includes polydimethylsiloxane, and the material of the peripheral structure includes glass.

In a third aspect, this disclosure further provides a detection method of a stretchable display module. The stretchable display module includes a display panel and a feedback regulation unit. The display panel has a stretchable region and includes at least one stretchable closed loop circuit surrounding at least a portion of the stretchable region; and the feedback regulation unit is electrically connected to the at least one stretchable closed loop circuit. The detection method includes following steps of: providing a magnetic field at least covering the stretchable region and being perpendicular to a display surface of the display panel; lighting up and stretching the stretchable display module; and acquiring, by the feedback regulation unit, an induced electromotive force generated by the at least one stretchable closed loop circuit, and determining a failed position of the display panel according to a magnitude of the induced electromotive force.

In the detection method of the stretchable display module provided by this disclosure, the step of determining the failed position of the display panel according to the magnitude of the induced electromotive force includes: determining the corresponding stretchable closed loop circuit as being pulled to break and the failed position of the display panel as being located in the corresponding stretchable closed loop circuit when the induced electromotive force is zero.

In the detection method of the stretchable display module provided by this disclosure, the stretchable display module further includes a magnetic field generator disposed on at least one side of the display panel; the magnetic field generator at least covers the stretchable region; and the step of providing the magnetic field at least covering the stretchable region and being perpendicular to the display surface of the display panel includes: generating, by the magnetic field generator, the magnetic field at least covering the stretchable region and being perpendicular to the display surface of the display panel.

In the detection method of the stretchable display module provided by this disclosure, the magnetic field generator includes a carrier at least covering the stretchable region, and an electroconductive coil or electroconductive ink surrounding an edge of the carrier.

In the detection method of the stretchable display module provided by this disclosure, the carrier includes a main carrier body and a peripheral structure surrounding an edge of the main carrier body; the electroconductive coil or the electroconductive ink surrounds the peripheral structure; and a material of the main carrier body is a stretchable material, and a material of the peripheral structure is an unstretchable material.

In the detection method of the stretchable display module provided by this disclosure, the display panel further includes a peripheral region surrounding the stretchable region. The at least one stretchable closed loop circuit includes: a plurality of pixel islands, which are disposed in the stretchable region and sequentially separately disposed in a predetermined direction; stretchable wires connecting arbitrary adjacent two of the plurality of pixel islands; and peripheral stretchable traces, which are disposed in the peripheral region and serially connected to the plurality of pixel islands and the stretchable wires in a closed-loop manner. The feedback regulation unit is electrically connected to the stretchable wires or the peripheral stretchable traces.

In the detection method of the stretchable display module provided by this disclosure, the stretchable display module further includes an energy storage unit, which is electrically connected to the at least one stretchable closed loop circuit, and is for storing the induced electromotive force generated by the at least one stretchable closed loop circuit.

Compared with the existing technology, a stretchable display module and a control method and a detection method thereof provided by this disclosure may generate a magnetic field by the magnetic field generator, so that the stretchable region of the display panel is shrouded by the magnetic field. In the stretching process of the stretchable display module, the area enclosed by the stretchable closed loop circuit may gradually increase, so that the magnetic flux passing through the stretchable closed loop circuit may also increase. Because the magnetic flux changes, the induced electromotive force is generated on the stretchable closed loop circuit. The feedback regulation unit acquires the induced electromotive force on the stretchable closed loop circuit in real time, and the stretch state of the stretchable display module is regulated according to a magnitude of the induced electromotive force. Therefore, the stretch state of the stretchable display module may be real-time monitored and regulated, thereby preventing the stretchable display module from getting failed because of the panel damage caused by over-stretching and too-fast stretching, and thereby increasing the service lifetime of the product. In addition, when the stretchable display module has caused the panel failure because of the over-stretching and too-fast stretching, the stretchable display module may be lighted up and stretched while being disposed in the magnetic field generated by the magnetic field generator or the external magnetic field in the process of repairing the stretchable display module. In addition, a failed position can be positioned in a precise and high efficient manner according to a magnitude of the induced electromotive force on the stretchable closed loop circuit, thereby significantly decreasing the manpower and the machine cost.

BRIEF DESCRIPTION OF THE SEVERAL VIEWS OF THE DRAWINGS

The technical solutions and other beneficial effects of this disclosure will become obvious by describing the specific implementation embodiments of this disclosure hereinbelow in detail in conjunction with the accompanying drawings.

DESCRIPTION OF SPECIFIC EMBODIMENTS OF THE INVENTION

The technical solutions in the embodiments of this disclosure will be clearly and completely described in the following with reference to the drawings of the embodiments of this disclosure. Obviously, the described embodiments are only a part of the embodiments of this disclosure, rather than all the embodiments. Based on the embodiments of this disclosure, all other embodiments obtained by those skilled in the art without creative works are deemed as falling within the scope of this disclosure.

In the description of this disclosure, it is to be understood that terms "center," "longitudinal," "transversal," "length," "width," "thickness," "upper," "lower," "front," "rear," "left," "right," "vertical," "horizontal," "top," "bottom," "inside," "outside," "clockwise," and "counterclockwise" for indicating the orientation or position relationships represent the orientation or position relationships based on the drawing, are only provided for the purposes of describing this disclosure and simplifying the description, but do not indicate or imply that the directed devices or elements must have the specific orientations, constructed and operated in the specific orientations, and thus cannot be understood as the restriction to this disclosure. In addition, the terms "first" and "second" are only used for descriptive purposes, and cannot be understood as indicating or implying relative importance or implicitly indicating the number of technical features as indicated. Thus, the features defined with "first" and "second" may explicitly or implicitly include one or multiple features. In the description of this disclosure, the meaning of "multiple" includes two or more than two, unless otherwise specified.

In the description of this disclosure, it is to be described that, unless otherwise expressly stated and limited, the terms "mount," "link," and "connect" should be broadly understood; may be, for example, the fixed connection, the detachable connection or the integral connection; may be the mechanical connection, the electrical connection or the mutual communication; and may be the direct connection, the indirect connection through a middle medium, and the internal communication or interaction between two elements. For those of ordinary skill in the art, the specific meaning of the above-mentioned terms in this disclosure can be understood according to the specific condition.

In this disclosure, unless otherwise expressly stated and limited, the first feature being disposed "on" or "under" the second feature may include the condition that the first feature directly contacts the second feature, and may also include the condition that the first feature indirectly contacts the second feature through another feature disposed therebetween. In addition, the first feature being disposed above, over or on the second feature includes the condition that the first feature is disposed directly and obliquely above the second feature, or only the condition that the level of the first feature is higher than that of the second feature. The first feature being disposed under, below or beneath the second feature includes the condition that the first feature is disposed directly and obliquely below the second feature, or only the condition that the level of the first feature is lower than that of the second feature.

The following disclosure provides many different implementations or examples for realizing different structures of this disclosure. In order to simplify the publication of this disclosure, the components and configurations of specific examples are described hereinbelow. Of course, they are only examples, and are not intended to limit this disclosure. In addition, reference digits and/or reference characters may be repeated in different examples of this disclosure, wherein such the repetition is for the purpose of simplification and clarity, and does not in itself indicate the relationship between the various embodiments and/or configurations discussed. In addition, this disclosure provides examples of various specific processes and materials, but those of ordinary skill in the art may be aware of the application of other processes and/or the use of other materials.

Uncontrollable problems in a stretching process tend to occur in a stretching process of a stretchable display module, and the problem of encountering the difficulty of positioning a failed position tends to occur when the failed stretchable display module is to be repaired. For the above-mentioned problems, a stretchable display module with a magnetoelectric feedback function is designed in this disclosure according to Ampere's rule and the electromagnetic induction principle.

Specifically, the stretchable display module is stretched under a changing or rated magnetic field (a magnetic-field direction is perpendicular to a display surface of the stretchable display module), an area change, caused by a stretch change of a stretchable closed loop circuit of the stretchable display module, causes a change of a magnetic flux, which then leads to a change of an induced electromotive force on the stretchable closed loop circuit. Because the above-mentioned process is performed in the stretching process in real-time, the induced electromotive force on the stretchable closed loop circuit is constantly generated and real-time fed back to a feedback regulation unit of the stretchable display module. The feedback regulation unit may timely regulate a stretching speed of the stretchable display module according to the change of a magnitude of the induced electromotive force, thereby preventing the stretchable display module from getting failed due to of the panel damage caused by over-stretching and too-fast stretching, and thereby increasing the service lifetime of the product.

The feedback regulation unit in the stretchable display module provided by this disclosure is also useful in the repairing of the stretchable display module, so that it is useful in the repairing of the terminal products, and also useful in the positioning and repairing of the problematic LED when the panel factory is manufacturing the panel. Specifically, the stretchable display module or the display panel is placed in a magnetic field perpendicular to the display surface of the display panel and stretched, and the abnormal point is determined according to the change of the induced electromotive force on the stretchable closed loop circuit in the display panel. Such detection method can perform the precise and high efficient positioning on the failed point or the failure region, thereby significantly decreasing the manpower and the machine cost.

Figure 1:
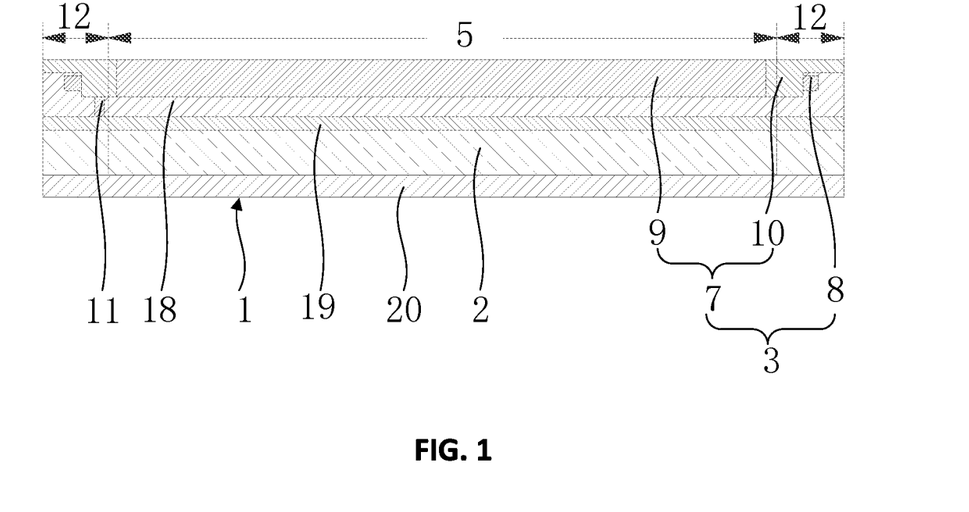
FIG. 1 is a schematic structure view showing a stretchable display module provided by an embodiment of this disclosure.
Figure 2:
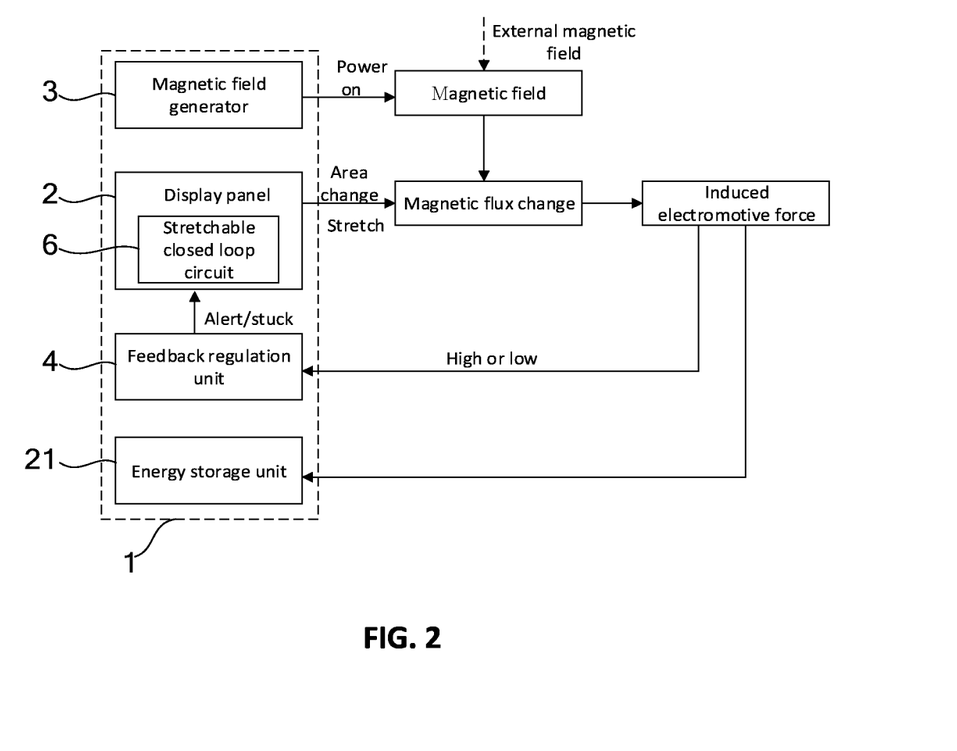
FIG. 2 is a schematic view showing a working principle of a stretchable display module provided by the embodiment of this disclosure.

Referring to FIGS. 1 and 2, an embodiment of this disclosure provides a stretchable display module 1, which includes a display panel 2, a magnetic field generator 3 disposed on at least one side of the display panel 2, and a feedback regulation unit 4 electrically connected to the display panel 2.

In a specific implementation method, the magnetic field generator 3 may be disposed on one single side of the display panel 2. For example, the magnetic field generator 3 is disposed on a display surface of the display panel 2, or a backside of the display panel 2 opposite to the display surface. In another specific implementation method, the magnetic field generator 3 may also be disposed on two opposite sides of the display panel 2, such as the display surface and the backside. It is understandable that when the magnetic field generator 3 is disposed on the display surface of the display panel 2, a protection cover plate needs not to be disposed on the display surface, and when the magnetic field generator 3 is only disposed on the backside of the display panel 2, the protection cover plate still needs to be disposed on the display surface. In the embodiment of this disclosure, the magnetic field generator 3 disposed on the display surface of the display panel 2 is taken as an example for explanation.

Figure 4:
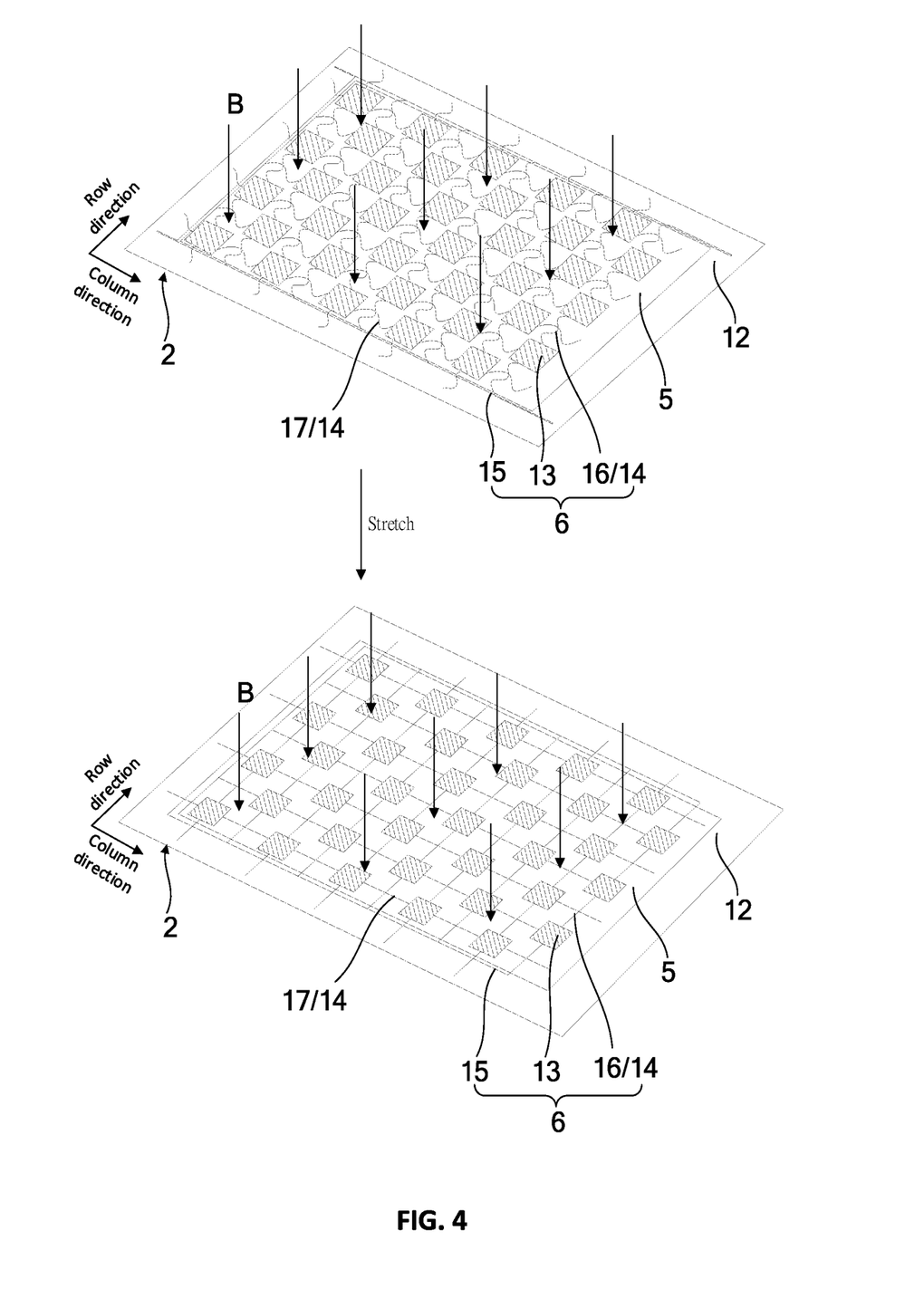
FIG. 4 is a schematic view showing a display panel before and after being stretched in a stretchable display module provided by the embodiment of this disclosure.

Specifically, referring to FIGS. 1 and 4, the display panel 2 has a stretchable region 5, and includes at least one stretchable closed loop circuit 6 surrounding at least a portion of the stretchable region 5. The magnetic field generator 3 at least covers the stretchable region 5 and is for generating a magnetic field B at least covering the stretchable region 5 and being perpendicular to the display surface of the display panel 2.

Specifically, the feedback regulation unit 4 is electrically connected to the at least one stretchable closed loop circuit, is for acquiring an induced electromotive force, generated by the at least one stretchable closed loop circuit under an action of the magnetic field, in real time in a stretching process of the stretchable display module, and regulates a stretch state of the stretchable display module according to a magnitude of the induced electromotive force.

It is understandable that the stretchable region 5 in this disclosure at least includes a display area. In a specific implementation method, the stretchable region 5 is equivalent to the display area. Of course, in other implementation methods, the stretchable region 5 may further include at least a portion of a non-display area.

Specifically, the magnetic field generated by the magnetic field generator 3 is a rated magnetic field, and the magnetic field is a normal phase magnetic field. That is, the direction of the magnetic field is perpendicular to the display surface of the display panel 2.

Figure 3:
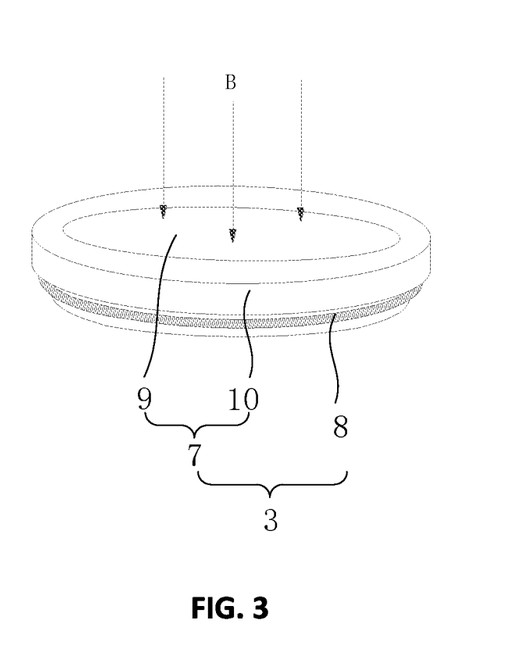
FIG. 3 is a schematic structure view showing a magnetic field generator provided by the embodiment of this disclosure.

Specifically, as shown in FIGS. 1 and 3, the magnetic field generator 3 may be a magnetic lens, and includes a carrier 7 at least covering the stretchable region 5 and an electroconductive coil 8 or electroconductive ink surrounding an edge of the carrier 7, for example.

In a specific implementation method, the carrier 7 includes a main carrier body 9 and a peripheral structure 10 surrounding an edge of the main carrier body 9. The electroconductive coil 8 or electroconductive ink surrounds the peripheral structure 10. A material of the main carrier body 9 is a stretchable material, such as polydimethylsiloxane (PDMS), and a material of the peripheral structure 10 is an unstretchable material, such as glass.

Specifically, the main carrier body 9 is made of the stretchable material to make the magnetic field generator 3 have the stretch ability, and to protect the display panel 2. It is understandable that the magnetic field generator 3 also performs the stretching movement in the stretching process of the stretchable display module 1.

Specifically, the electroconductive coil 8 or electroconductive ink is also made of the stretchable material. When the stretchable display module 1 is stretched, the area enclosed by the electroconductive coil 8 or electroconductive ink becomes larger. In order to guarantee that the generated magnetic field is the rated magnetic field B, the current introduced into the electroconductive coil 8 or electroconductive ink needs to be continuously increased.

Specifically, referring to FIG. 1, the stretchable display module 1 further includes a magnet wire 11, which is disposed between the display panel 2 and the magnetic field generator 3 and electrically connected to the electroconductive coil 8 or electroconductive ink, and for providing the current to the electroconductive coil 8 or electroconductive ink to generate the magnetic field.

Specifically, when the current flows through the electroconductive coil 8 or electroconductive ink, the magnetic field generator 3 can generate the magnetic field, and the magnitude of the magnetic induction intensity B of the magnetic field is represented by Formula (1):

$$B(Wb/m^2) = \frac{\phi(Wb)}{N \times Ae(m^2)}, \quad (1)$$

where B denotes the magnetic induction intensity; φ denotes the magnetic flux (measured value); N denotes a number of loops of the electroconductive coil 8 or electroconductive ink; and Ae denotes an effective area enclosed by the electroconductive coil 8 or electroconductive ink.

Specifically, as shown in FIG. 4, the display panel 2 further includes a peripheral region 12 (i.e., the non-display area) surrounding the stretchable region 5. The at least one stretchable closed loop circuit 6 includes: a plurality of pixel islands 13, which are disposed in the stretchable region 5 and sequentially separately disposed in a predetermined direction; stretchable wires 14 connecting arbitrary adjacent two of the plurality of pixel islands 13; and peripheral stretchable traces 15, which are disposed in the peripheral region 12 and serially connected to the plurality of pixel islands 13 and the stretchable wires 14 in a closed-loop manner. The feedback regulation unit 4 is electrically connected to the stretchable wires 14 or the peripheral stretchable traces 15.

Specifically, each pixel island 13 is provided with a LED device or micro LED device.

In a specific implementation method, as shown in FIG. 4, the display area of the display panel 2 is provided with the plurality of pixel islands 13 arranged in multiple rows and multiple columns, arbitrary adjacent two of the plurality of pixel islands 13 in each row of the plurality of pixel islands 13 are electrically connected to each other by first stretchable wires 16, and arbitrary adjacent two of the plurality of pixel islands 13 in each column of the plurality of pixel islands 13 are electrically connected to each other by second stretchable wires 17. Two pixel islands 13 located at two ends of the row in each row of the plurality of pixel islands 13 are both electrically connected to the peripheral stretchable traces 15 disposed in the peripheral region 12. One stretchable closed loop circuit 6 is constituted by each row of the plurality of pixel islands 13, the corresponding first stretchable wires 16 and the peripheral stretchable trace 15 serially connected together. It is understandable that there are multiple stretchable closed loop circuits 6.

Specifically, each row of the plurality of pixel islands may be serially connected to the same peripheral stretchable trace. Of course, in another implementation method, the peripheral stretchable traces correspondingly and serially connected to two adjacent rows of the plurality of pixel islands do not overlap. That is, the two adjacent rows of the plurality of pixel islands are respectively serially connected to two different peripheral stretchable traces. It is understandable that the number of the peripheral stretchable trace or traces is not restricted in this disclosure. As shown in FIG. 4, the two adjacent rows of the plurality of pixel islands 13 are respectively serially connected to the two different peripheral stretchable traces in the example embodiment of this disclosure, and only one peripheral stretchable trace 15 is depicted in the drawing for demonstration.

Specifically, the peripheral stretchable circuit may be a gate driver on array (GOA) circuit, and may also be an additional serial circuit. It is understandable that the pixel islands 13, the first stretchable wires 16 and the second stretchable wires 17 are located in the stretchable region 5. In addition, the stretchable closed loop circuit 6 and the circuit for displaying in the embodiment of this disclosure may be the same circuit to decrease the wiring density of the display panel 2.

Figure 5:
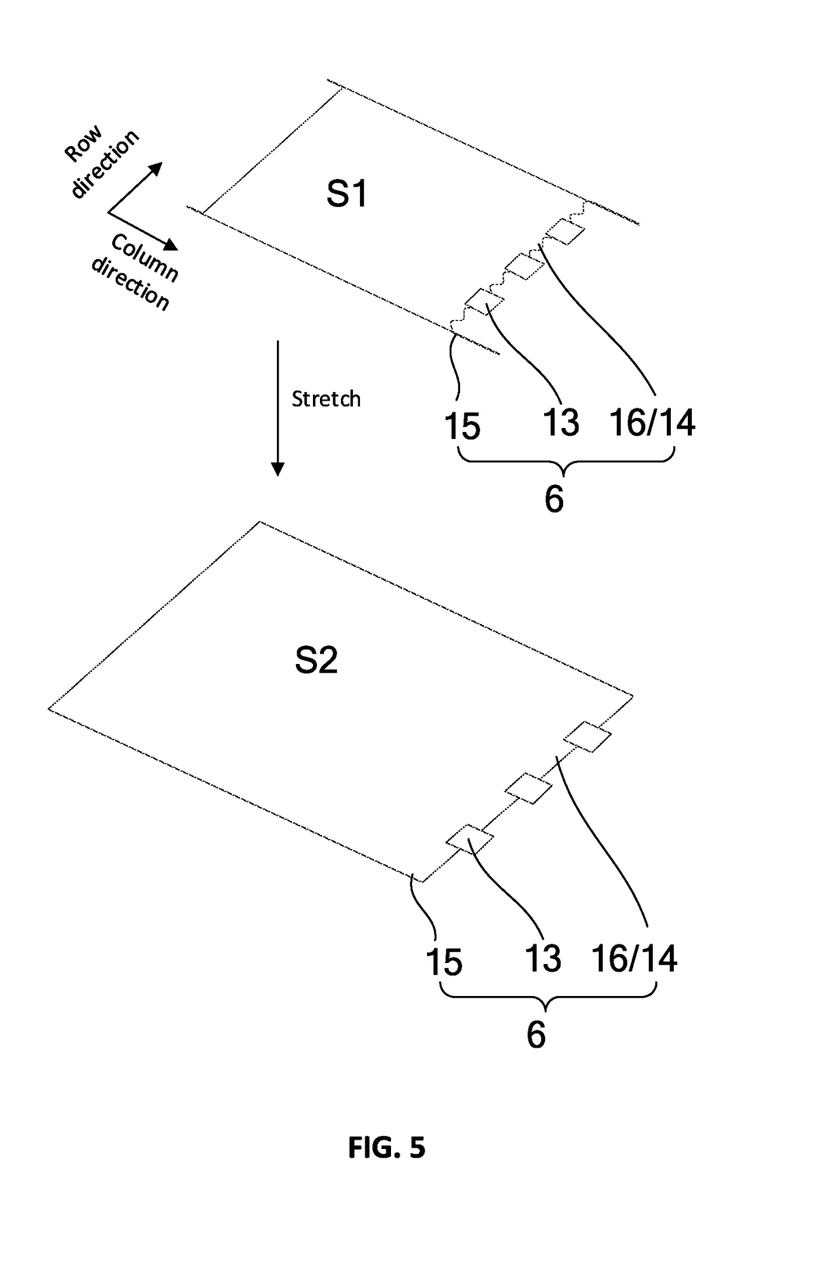
FIG. 5 is a schematic view showing a stretchable closed loop circuit provided by FIG. 4 before and after being stretched.

Specifically, as shown in FIG. 5, an initial area and a stretch ending area enclosed by each stretchable closed loop circuit 6 are inconsistent with each other, and the area increases with stretching. In a specific implementation method, during the normal stretching movement, the area variations of different stretchable closed loop circuits within the same time are inconsistent with each other, and the variation of the area enclosed by the outermost ring of stretchable closed loop circuit includes the variation of the area enclosed by the inner coil stretchable closed loop circuit.

In another specific implementation method, the pixel islands 13 located at two ends in each column of the pixel islands 13 are electrically connected to another peripheral stretchable trace (not shown in the drawing) disposed on the peripheral region 12, and another stretchable closed loop circuit is constituted by each column of the pixel islands 13, the corresponding second stretchable wires 17 and the another peripheral stretchable trace serially connected together.

Specifically, in the stretching process of the stretchable display module 1, the change value Δφ of the magnetic flux of the region enclosed by each stretchable closed loop circuit is represented by Formula (2):

$$\Delta\phi = \Delta S \times B \qquad (2),$$

where Δs denotes the area variation of the region enclosed by the stretchable closed loop circuit, and has the unit of m²; and B is magnetic induction intensity, and has the unit of wb/m².

A magnitude of the induced electromotive force E generated by each stretchable closed loop circuit is represented by Formula (3):

$$E = n\frac{\Delta\phi}{\Delta t} \qquad (3)$$

where n denotes a number of loops of the stretchable closed loop circuit; and Δt denotes the stretch time and has the unit of h.

It is understandable that the number "n" of loop of the stretchable closed loop circuit is equal to 1 in the embodiment of this disclosure.

Of course, in other implementation methods, the stretchable closed loop circuit may be a closed loop trace additionally disposed in the display panel 2 surrounding the stretchable region 5. At this time, the number "n" of loops of the stretchable closed loop circuit may be greater than 1.

Specifically, referring to FIG. 1, the stretchable display module 1 further includes an adhesive layer 18 disposed between the display panel 2 and the magnetic field generator 3. A material of the adhesive layer 18 includes an optical clear adhesive (OCA), may be specifically an ultraviolet (UV) series OCA, and may also be a silicone series OCA. It is understandable that the silicone series OCA is selected with the higher priority because it is beneficial to the increase of resilience of the adhesive layer 18. Specifically, the OCA has advantages of high transmittance, high viscosity, and good coverage of the step generated by the electroconductive coil 8 or the electroconductive ink in the magnetic field generator 3.

Specifically, referring to FIG. 1, the stretchable display module 1 further includes a polarizer (POL) 19 disposed between the display panel 2 and the adhesive layer 18 and a protection layer 20 disposed on the display panel 2 away from one side of the polarizer 19. The material of the protection layer 20 includes foam, but is of course not limited thereto. It is understandable that the protection layer 20 is disposed on the backside of the display panel 2 (one surface opposite to the display surface).

In this embodiment, as shown in FIG. 2, it is possible to configure the magnetic field B generated by the magnetic field generator 3 to be perpendicular to the display surface of the display panel 2, so that the stretchable region 5 of the display panel 2 is shrouded by the magnetic field. In the stretching process of the stretchable display module 1, the area enclosed by the stretchable closed loop circuit 6 may gradually increase, so that the magnetic flux passing through the stretchable closed loop circuit 6 may also increase. Because the magnetic flux changes, the induced electromotive force is generated on the stretchable closed loop circuit 6. The feedback regulation unit 4 acquires the induced electromotive force on the stretchable closed loop circuit 6 in real time, and the stretch state of the stretchable display module 1 is regulated according to a magnitude of the induced electromotive force. Therefore, the stretch state of the stretchable display module 1 may be real-time monitored and regulated in the embodiment of this disclosure, thereby preventing the stretchable display module 1 from getting failed because of the panel damage caused by over-stretching and too-fast stretching, and thereby increasing the service lifetime of the product. In addition, when the stretchable display module 1 has caused the panel failure because of the over-stretching and too-fast stretching, the stretchable display module 1 may be lighted up and stretched while being disposed in the rated magnetic field generated by the magnetic field generator 3 or the externally applied rated magnetic field in the process of repairing the stretchable display module 1. In addition, a failed position can be repositioned in a precise and high efficient manner according to a magnitude of the induced electromotive force on the stretchable closed loop circuit 6, thereby significantly decreasing the manpower and the machine cost.

As shown in FIG. 2, the embodiment of this disclosure further provides a stretchable display module, which is different from that of the above-mentioned embodiment in that the stretchable display module further includes an energy storage unit 21, which is electrically connected to the at least one stretchable closed loop circuit 6, and is for storing the induced electromotive force generated by the at least one stretchable closed loop circuit 6.

In this embodiment, in addition to the advantages possessed by the stretchable display module 1 of the above-mentioned embodiment, disposing the energy storage unit 21 in the stretchable display module can further store the induced electromotive force generated by each coil of stretchable closed loop circuit 6 and provide the induced electromotive force for the stretchable display module, thereby saving the electricity and significantly increasing the endurance of the stretchable display module. If the stored induced electromotive force is enough, it is even unnecessary to charge the stretchable display module.

Figure 6:
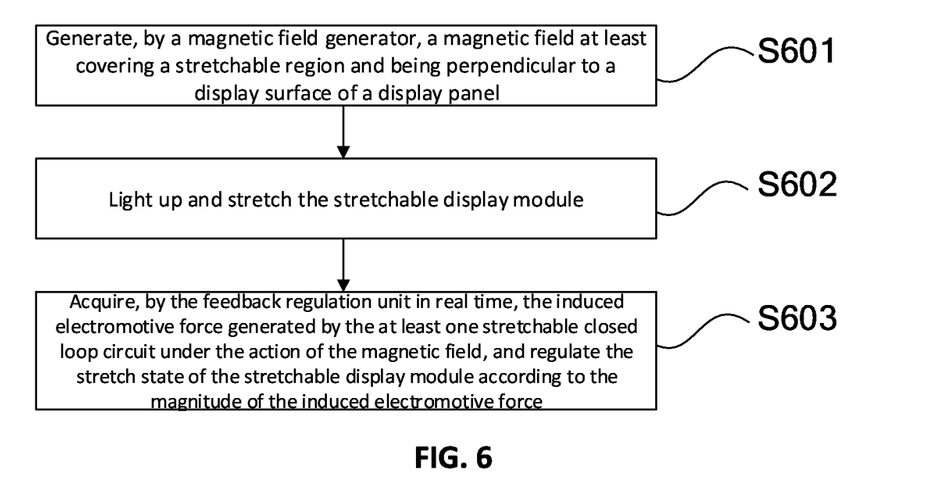
FIG. 6 is a flow chart showing a control method of a stretchable display module provided by an embodiment of this disclosure.

Referring to FIG. 6, the embodiment of this disclosure further provides a control method used in an arbitrary one of the stretchable display modules in the above-mentioned embodiments, and the control method includes following steps S601 to S603.

In the step S601, the magnetic field at least covering the stretchable region and being perpendicular to the display surface of the display panel is generated by the magnetic field generator.

In the step S602, the stretchable display module is lighted up and stretched.

In the step S603, the induced electromotive force, generated by the at least one stretchable closed loop circuit under an action of the magnetic field, is acquired by the feedback regulation unit in real time, and the stretch state of the stretchable display module is regulated according to the magnitude of the induced electromotive force.

Specifically, in the step S603, the step of regulating the stretch state of the stretchable display module according to the magnitude of the induced electromotive force includes the following steps.

When the induced electromotive force falls within a predetermined voltage range, the stretchable display module is determined as being stretched normally.

When the induced electromotive force deviates from the predetermined voltage range, the stretchable display module is determined as being stretched abnormally, and a stretching speed of the stretchable display module is regulated according to the magnitude of the induced electromotive force deviating from the predetermined voltage range.

Specifically, the conditions that the induced electromotive force deviating from a predetermined voltage range includes the condition that the induced electromotive force is greater than the maximum in the predetermined voltage range, the condition that the induced electromotive force is smaller than the minimum in the predetermined voltage range, and the condition that the induced electromotive force is equal to zero.

Specifically, when the induced electromotive force of the stretchable closed loop circuit is greater than the maximum in the predetermined voltage range, the stretchable display module is determined as being stretched too fast, and the stretching speed is reduced by a deceleration alert or the stretch is stuck at the same time. When the induced electromotive force of the stretchable closed loop circuit is smaller than the minimum in the predetermined voltage range, the stretchable display module is determined as being stretched too slow or being not stretched, and the stretching speed is increased by an acceleration alert or other methods at the same time. When the induced electromotive force of the stretchable closed loop circuit equals zero, the stretchable closed loop circuit is determined as being pulled to break, and a failure alert reminds that the stretchable display module needs to be repaired at the same time.

Referring in conjunction with FIGS. 1 to 5, the stretchable display module 1 is taken as a stretchable watch in an example of the embodiment of this disclosure. A magnetic induction intensity of the magnetic field generated by the magnetic field generator 3 is represented by B=0.1 wb/m$^2$, wherein the predetermined stretch time ranges from 1 s to 10 s (i.e., from 0.00027 h to 0.0027 h). As shown in FIG. 5, an initial stretch area S1 of the stretchable closed loop circuit 6 on the outermost ring is equal to 416 square millimeters, an area S2 after the stretchable closed loop circuit 6 is stretched is equal to 669 square millimeters, and an amount of the area variation is equal to 253 square millimeters (i.e., 0.000253 m$^2$).

In this case, the maximum induced electromotive force generated by the outermost ring of the stretchable closed loop circuit 6 is represented by $E_{max}$=0.000253×0.1/0.00027=0.094 V, and the minimum induced electromotive force is represented by $E_{min}$=0.000253×0.1/0.0027=0.0094 V. Therefore, the induced electromotive force in the normal stretch state should range from 0.01 V to 0.1 V. That is, the predetermined voltage ranges from 0.01 V to 0.1 V.

In a stretching process of the stretchable watch, when the induced electromotive force of the outermost ring of the stretchable closed loop circuit 6 obtained by the feedback regulation unit 4 falls within the range from 0.01 V to 0.1 V, the stretchable watch is determined as being stretched normally. When the induced electromotive force of the outermost ring of the stretchable closed loop circuit 6 obtained by the feedback regulation unit 4 is greater than 0.1 V, the stretchable watch is determined as being stretched too fast, and the stretching speed is reduced by a deceleration alert or the stretch is stuck at the same time. When the induced electromotive force of the outermost ring of the stretchable closed loop circuit 6 obtained by the feedback regulation unit 4 is equal to 0.01 V, the stretchable watch is determined as being stretched too slow or being not stretched, and the stretching speed is increased by an acceleration alert or other methods at the same time. When the induced electromotive force of the outermost ring of the stretchable closed loop circuit 6 obtained by the feedback regulation unit 4 is zero, the outermost ring of the stretchable closed loop circuit 6 is determined as being pulled to break and a failure alert reminds that the stretchable display module needs to be repaired at the same time.

In this embodiment, the magnetic field generated by the magnetic field generator 3 is configured to be perpendicular to the display surface of the display panel 2, so that the stretchable region 5 of the display panel 2 is shrouded by the magnetic field. In the stretching process of the stretchable display module 1, the area enclosed by the stretchable closed loop circuit 6 may gradually increase, so that the magnetic flux passing through the stretchable closed loop circuit 6 may also increase. Because the magnetic flux changes, the induced electromotive force is generated on the stretchable closed loop circuit 6. The feedback regulation unit 4 acquires the induced electromotive force on the stretchable closed loop circuit 6 in real time, and the stretch state of the stretchable display module 1 is regulated according to a magnitude of the induced electromotive force. Therefore, the stretch state of the stretchable display module 1 may be real-time monitored and regulated in the embodiment of this disclosure, thereby preventing the stretchable display module 1 from getting failed because of the panel damage caused by over-stretching and too-fast stretching, and thereby increasing the service lifetime of the product.

Figure 7:
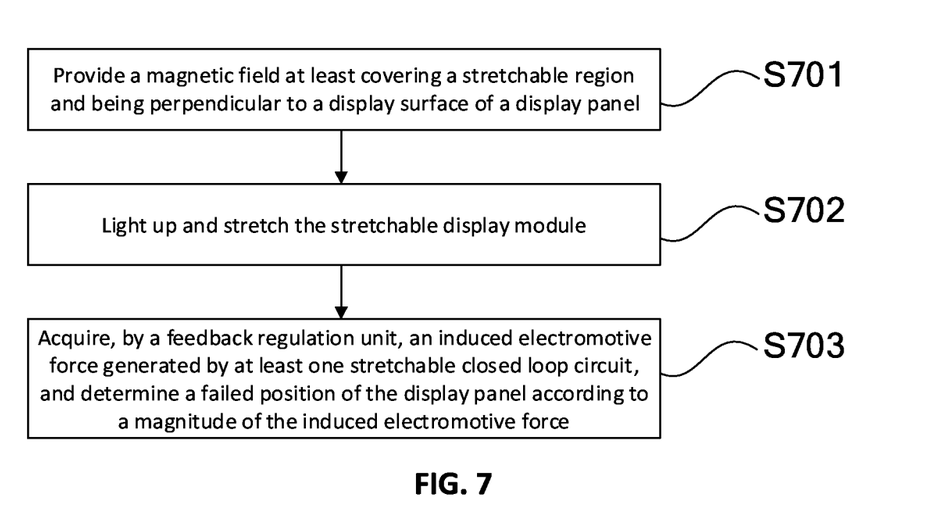
FIG. 7 is a flow chart showing a detection method of a stretchable display module provided by an embodiment of this disclosure.

Referring to FIG. 7, the embodiment of this disclosure further provides a detection method of a stretchable display module for positioning a failed position.

Specifically, the stretchable display module includes a display panel and a feedback regulation unit. The display panel has a stretchable region and includes at least one stretchable closed loop circuit surrounding at least a portion of the stretchable region. The feedback regulation unit is electrically connected to the at least one stretchable closed loop circuit. It is to be described that the structures of the display panel and the feedback regulation unit in the embodiment of this disclosure are the same as those of the display panel 2 and the feedback regulation unit 4 in the stretchable display module 1 provided by the above-mentioned embodiment, and detailed descriptions thereof will be omitted.

Specifically, the detection method includes following steps S701 to S703.

In the step S701, a magnetic field, at least covering the stretchable region and being perpendicular to a display surface of the display panel, is provided.

Specifically, as shown in FIG. 2, the magnetic field may be an external magnetic field and may also be generated by disposing the magnetic field generator in the stretchable display module, and no restriction is made thereto.

Specifically, the structures of the magnetic field generator in the embodiment of this disclosure and are the same as those of the magnetic field generator 3 in the stretchable display module 1 provided by the above-mentioned embodiment, and detailed descriptions thereof will be omitted.

It is understandable that when the magnetic field is generated by the magnetic field generator disposed in the stretchable display module in the detection method, the structures of the stretchable display module in the embodiment of this disclosure may be completely the same as those of the stretchable display module 1 provided by the above-mentioned embodiment. In addition, when the magnetic field is the external magnetic field, it is possible that no magnetic field generator is disposed in the stretchable display module.

In the step S702, the stretchable display module is lighted up and stretched.

In the step S703, an induced electromotive force generated by the at least one stretchable closed loop circuit is acquired by the feedback regulation unit, and a failed position of the display panel is determined according to a magnitude of the induced electromotive force.

Specifically, in the step S703, the step of determining the failed position of the display panel according to the magnitude of the induced electromotive force includes the following step.

When the induced electromotive force is zero, the corresponding stretchable closed loop circuit is determined as being pulled to break and the failed position of the display panel is determined as being located in the corresponding stretchable closed loop circuit.

In this embodiment, when the stretchable display module has caused the panel failure because of the over-stretching and too-fast stretching, the stretchable display module may be lighted up and stretched while being disposed in the rated magnetic field generated by the magnetic field generator or the externally applied rated magnetic field in the process of repairing the stretchable display module. In addition, a failed position can be positioned in a precise and high efficient manner according to a magnitude of the induced electromotive force on the stretchable closed loop circuit, thereby significantly decreasing the manpower and the machine cost.

In the above-mentioned embodiments, the description of each embodiment has its own focus. For parts that are not described in detail in one embodiment, reference can be made to the relevant description of other embodiments.

Detailed introductions have been made to a stretchable display module and a control method and a detection method thereof provided by the embodiments of this disclosure. In this disclosure, specific examples are used to explain the principles and implementation of this disclosure, the description of the above-mentioned embodiments is only used to help readers understand the technical solutions and core ideas of this disclosure. Those of ordinary skill in the art should understand that: they can still modify the technical solutions described in the above-mentioned embodiments, or equivalently replace some of the technical features; and these modifications or replacements do not cause the essence of the corresponding technical solutions to deviate from the scope of the technical solutions of the embodiments of this disclosure.

What is claimed is:

1. A stretchable display module, comprising: a display panel, a magnetic field generator disposed on at least one side of the display panel, and a feedback regulation unit electrically connected to the display panel,
   wherein the display panel has a stretchable region and comprises at least one stretchable closed loop circuit surrounding at least a portion of the stretchable region;
   the magnetic field generator at least covers the stretchable region and is used for generating a magnetic field at least covering the stretchable region and perpendicular to a display surface of the display panel; and
   the feedback regulation unit is electrically connected to the at least one stretchable closed loop circuit, is used for acquiring an induced electromotive force, generated by the at least one stretchable closed loop circuit under an action of the magnetic field, in real time in a stretching process of the stretchable display module, and regulates a stretch state of the stretchable display module according to a magnitude of the induced electromotive force.

2. The stretchable display module according to claim 1, wherein:
the display panel further comprises a peripheral region surrounding the stretchable region;
the at least one stretchable closed loop circuit comprises: a plurality of pixel islands, which are disposed in the stretchable region and sequentially separately disposed in a predetermined direction; stretchable wires connecting arbitrary adjacent two of the plurality of pixel islands; and peripheral stretchable traces, which are disposed in the peripheral region and serially connected to the plurality of pixel islands and the stretchable wires in a closed-loop manner; and
the feedback regulation unit is electrically connected to the stretchable wires or the peripheral stretchable traces.

3. The stretchable display module according to claim 1, wherein the stretchable display module further comprises an energy storage unit, which is electrically connected to the at least one stretchable closed loop circuit, and is used for storing the induced electromotive force generated by the at least one stretchable closed loop circuit.

4. The stretchable display module according to claim 1, wherein the magnetic field generator comprises a carrier at least covering the stretchable region, and an electroconductive coil or electroconductive ink surrounding an edge of the carrier.

5. The stretchable display module according to claim 4, wherein: the carrier comprises a main carrier body and a peripheral structure surrounding an edge of the main carrier body; the electroconductive coil or the electroconductive ink surrounds the peripheral structure; and a material of the main carrier body is a stretchable material, and a material of the peripheral structure is an unstretchable material.

6. The stretchable display module according to claim 5, wherein the material of the main carrier body comprises polydimethylsiloxane, and the material of the peripheral structure comprises glass.

7. A control method used in the stretchable display module according to claim 1, comprising following steps of:
generating, by the magnetic field generator, the magnetic field at least covering the stretchable region and being perpendicular to the display surface of the display panel;
lighting up and stretching the stretchable display module; and
acquiring, by the feedback regulation unit in real time, the induced electromotive force generated by the at least one stretchable closed loop circuit under the action of the magnetic field, and regulating the stretch state of the stretchable display module according to the magnitude of the induced electromotive force.

8. The control method according to claim 7, wherein the step of regulating the stretch state of the stretchable display module according to the magnitude of the induced electromotive force comprises following steps of:
determining the stretchable display module as being stretched normally when the induced electromotive force falls within a predetermined voltage range; and
determining the stretchable display module as being stretched abnormally when the induced electromotive force deviates from the predetermined voltage range, and regulating a stretching speed of the stretchable display module according to the magnitude of the induced electromotive force deviating from the predetermined voltage range.

9. The control method according to claim 7, wherein:
the display panel further comprises a peripheral region surrounding the stretchable region;
the at least one stretchable closed loop circuit comprises: a plurality of pixel islands, which are disposed in the stretchable region and sequentially separately disposed in a predetermined direction; stretchable wires connecting arbitrary adjacent two of the plurality of pixel islands; and peripheral stretchable traces, which are disposed in the peripheral region and serially connected to the plurality of pixel islands and the stretchable wires in a closed-loop manner; and
the feedback regulation unit is electrically connected to the stretchable wires or the peripheral stretchable traces.

10. The control method according to claim 7, wherein the stretchable display module further comprises an energy storage unit, which is electrically connected to the at least one stretchable closed loop circuit, and is for storing the induced electromotive force generated by the at least one stretchable closed loop circuit.

11. The control method according to claim 7, wherein the magnetic field generator comprises a carrier at least covering the stretchable region, and an electroconductive coil or electroconductive ink surrounding an edge of the carrier.

12. The control method according to claim 11, wherein: the carrier comprises a main carrier body and a peripheral structure surrounding an edge of the main carrier body; the electroconductive coil or the electroconductive ink surrounds the peripheral structure; and a material of the main carrier body is a stretchable material, and a material of the peripheral structure is an unstretchable material.

13. The control method according to claim 12, wherein the material of the main carrier body comprises polydimethylsiloxane, and the material of the peripheral structure comprises glass.

14. A detection method of a stretchable display module, the stretchable display module comprising a display panel and a feedback regulation unit, wherein the display panel has a stretchable region and comprises at least one stretchable closed loop circuit surrounding at least a portion of the stretchable region; the feedback regulation unit is electrically connected to the at least one stretchable closed loop circuit; and the detection method comprising following steps of:
providing a magnetic field at least covering the stretchable region and being perpendicular to a display surface of the display panel;
lighting up and stretching the stretchable display module; and
acquiring, by the feedback regulation unit, an induced electromotive force generated by the at least one stretchable closed loop circuit, and determining a failed position of the display panel according to a magnitude of the induced electromotive force.

15. The detection method according to claim 14, wherein the step of determining the failed position of the display panel according to the magnitude of the induced electromotive force comprises:
determining the corresponding stretchable closed loop circuit as being pulled to break and the failed position of the display panel as being located in the corresponding stretchable closed loop circuit when the induced electromotive force is zero.

16. The detection method according to claim 14, wherein the stretchable display module further comprises a magnetic field generator disposed on at least one side of the display panel; the magnetic field generator at least covers the stretchable region; and the step of providing the magnetic field at least covering the stretchable region and being perpendicular to the display surface of the display panel comprises:
   generating, by the magnetic field generator, the magnetic field at least covering the stretchable region and being perpendicular to the display surface of the display panel.

17. The detection method according to claim 16, wherein the magnetic field generator comprises a carrier at least covering the stretchable region, and an electroconductive coil or electroconductive ink surrounding an edge of the carrier.

18. The detection method according to claim 17, wherein the carrier comprises a main carrier body and a peripheral structure surrounding an edge of the main carrier body; the electroconductive coil or the electroconductive ink surrounds the peripheral structure; and a material of the main carrier body is a stretchable material, and a material of the peripheral structure is an unstretchable material.

19. The detection method according to claim 14, wherein the display panel further comprises a peripheral region surrounding the stretchable region;
   the at least one stretchable closed loop circuit comprises: a plurality of pixel islands, which are disposed in the stretchable region and sequentially separately disposed in a predetermined direction; stretchable wires connecting arbitrary adjacent two of the plurality of pixel islands; and peripheral stretchable traces, which are disposed in the peripheral region and serially connected to the plurality of pixel islands and the stretchable wires in a closed-loop manner; and
   the feedback regulation unit is electrically connected to the stretchable wires or the peripheral stretchable traces.

20. The detection method according to claim 14, wherein the stretchable display module further comprises an energy storage unit, which is electrically connected to the at least one stretchable closed loop circuit, and is for storing the induced electromotive force generated by the at least one stretchable closed loop circuit.

* * * * *